Feb. 15, 1938. C. H. THAYER 2,108,087
APPARATUS FOR CONTACT TREATMENT OF MATERIALS
Filed Nov. 9, 1935 2 Sheets-Sheet 1
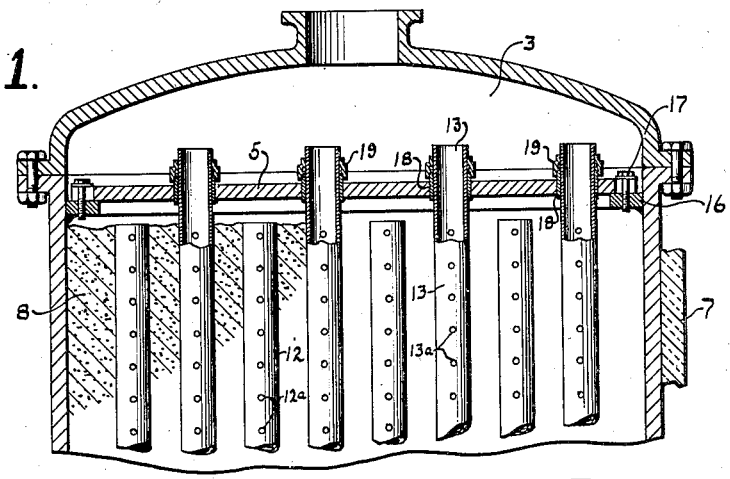
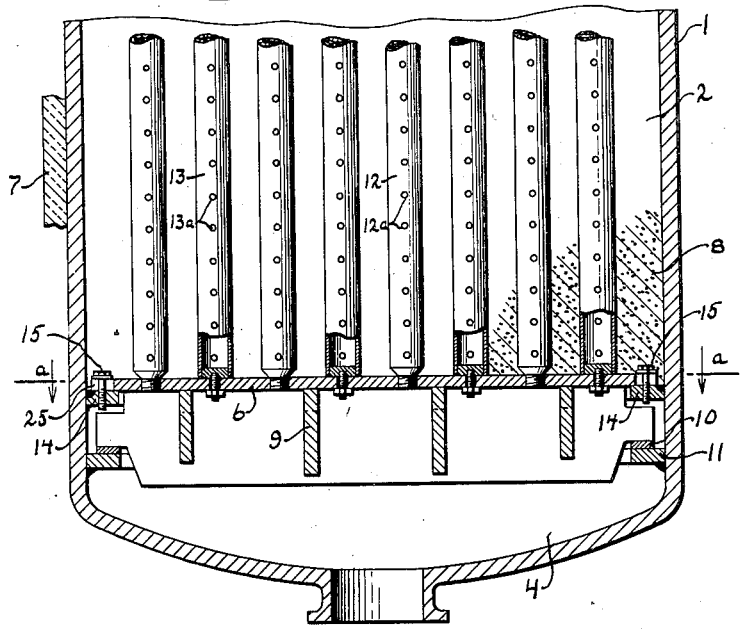
Fig.1.
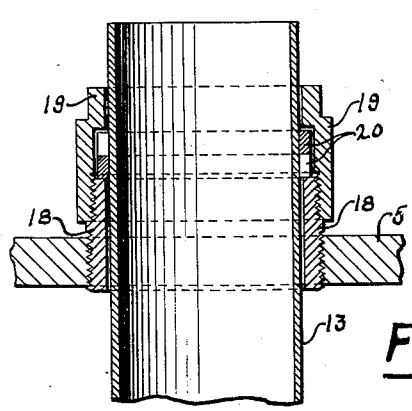
Fig.3.
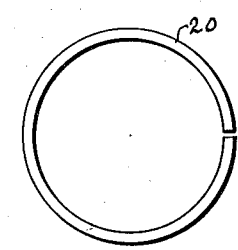
Fig.4.
INVENTOR
CLARENCE H. THAYER
BY
Ira L. Nickerson
ATTORNEY Feb. 15, 1938.  C. H. THAYER  2,108,087
APPARATUS FOR CONTACT TREATMENT OF MATERIALS
Filed Nov. 9, 1935  2 Sheets-Sheet 2
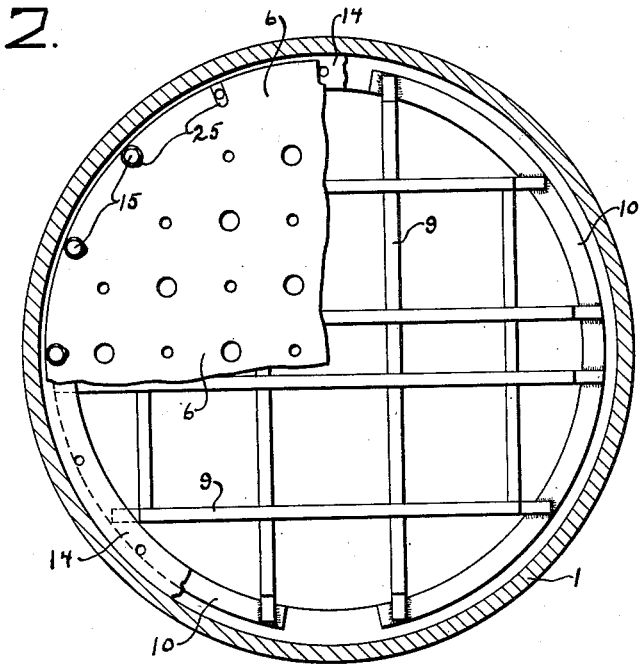
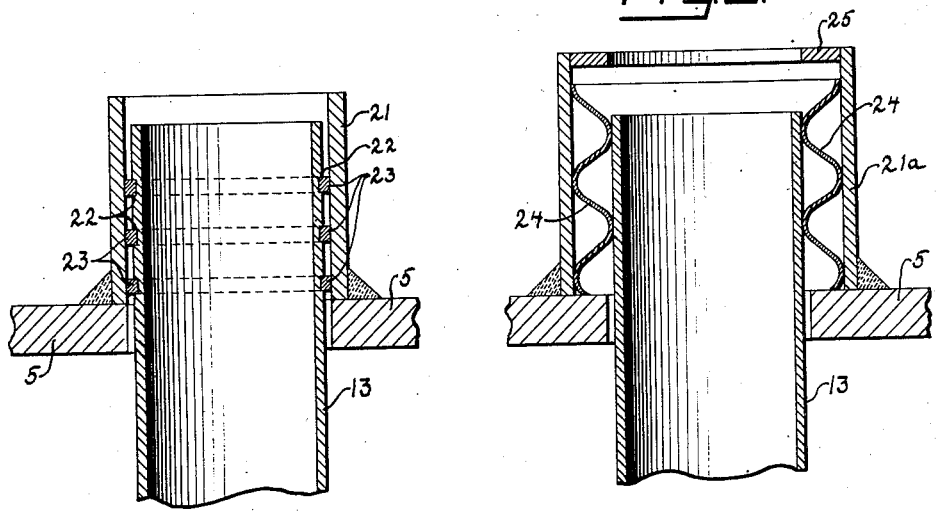
INVENTOR
CLARENCE H. THAYER
BY
Ira L. Nickerson
ATTORNEY Patented Feb. 15, 1938

2,108,087

UNITED STATES PATENT OFFICE 2,108,087

APPARATUS FOR CONTACT TREATMENT OF MATERIALS

Clarence H. Thayer, Wallingford, Pa., assignor, by mesne assignments, to Houdry Process Corporation, Wilmington, Del., a corporation of Delaware Application November 9, 1935, Serial No. 48,974

19 Claims. (Cl. 23—288)

The present invention relates to the art of treating materials, e. g., fluids, for the purpose of effecting changes or transformations thereof, of a chemical or other nature. More particularly the invention concerns treatments, for example the catalytic or contact treatment of fluids, where various parts of the treating apparatus undergo changes in temperature and accordingly experience expansions or contractions, with the consequent tendency to set up stresses in various parts of the apparatus or to cause undesirable relative motion of different parts.

In certain respects the present invention may be considered as involving improvements over or further developments of certain types of apparatus and as illustrated in the copending applications of Alfred Joseph, Serial No. 440,199½, filed March 31, 1930 (renewed March 2, 1934) and of Eugene J. Houdry, Serial No. 611,362, filed May 14, 1932 which issued June 2, 1936 as Patents Nos. 2,042,469 and 2,042,468, respectively. These applications show, inter alia, converter structures with a reaction chamber containing a contact material or catalytic mass and having apertured conduits extending within the reaction chamber and embedded in the mass. One group of the conduits may be employed for introducing fluid into the reaction chamber and distributing it throughout the contact mass therein, while a second group of the conduits may be employed for withdrawing fluid products of reaction from the reaction chamber.

In the normal course of operation of such apparatus, particularly when employed in the carrying out of endothermic and/or exothermic reactions, such, for example, as in the treatment or catalysis of hydrocarbons including mineral oils, in the synthesis of ammonia from its elements, in the oxidation of $SO_2$ into $SO_3$, etc., different parts of the apparatus are subjected to different temperatures which results in different degrees of thermal expansion of such parts. Also, such apparatus is commonly heated up and cooled down periodically, and this may occur non-uniformly, at different rates, and in different amounts in various parts of the apparatus. Further, it is common, for example, in the contact or catalytic treatment of hydrocarbon oils, to have alternate periods of contact treatment and regeneration, the latter being for the purpose of reactivating, cleaning or otherwise revivifying or regenerating the mass. During the "on-stream" periods, during which endothermic reactions usually take place, reactant fluids may be supplied at a temperature above that desired for the reaction, to supply a portion of the endothermic heat of reaction; whereas during the alternate regeneration periods, the regeneration fluid may be introduced at temperatures below that desired for regeneration to compensate, in a measure at least, for the heat developed in the exothermic regeneration. These operations, as will be evident, are accompanied by fluctuations in temperature in different parts of the apparatus. Whether the regeneration fluids follow the same path of flow as the fluids to be treated, or the reverse path, the temperature conditions in the inlet and withdrawal conduits and other parts of the apparatus will almost inevitably undergo substantial changes during each complete cycle of reaction and regeneration. These changes, of course, are attended by corresponding expansions and/or contractions of the various parts of the apparatus, including the conduits, tube sheets, casing or shell of the converter, etc.

It is an object of the invention to provide apparatus which will be firm and durable and yet will permit uneven expansion or contraction of different parts without distorting, or putting under extreme stress, other parts of the apparatus. The teaching of a method of assembly and operation of such apparatus is a closely allied object. It is another object of this invention to lessen or reduce to a minimum movement of the several conduits, relative to each other, due to elongation and contraction thereof in apparatus where such conduits are employed. Further objects include providing, where the problem is involved, a freely floating yet firm support for the conduits and contact mass, partitions at either end of the reaction chamber which are free to expand or contract independently of the casing and yet form an approximately fluid-tight reaction chamber therewith, and a method of assembly or mounting of conduits which will lessen or eliminate the grinding or pulverization of the contact mass or catalyst and the buckling or distortion of parts during the heating up and cooling down of the apparatus or parts thereof, and the attendant expansions and/or contractions of the same.

The above and numerous other objects and advantages will become apparent by reference to one specific illustration and adaptation of the invention as shown in the accompanying drawings, in which:

Fig. 1 is an elevational view in section of a converter structure;

Fig. 2 is a plan view, taken on line a—a of Fig. 1, looking down, showing the bottom partition or tube sheet of the converter partly broken away to bring into view the supporting beam or grid structure therebeneath;

Fig. 3 is a detail view of a portion of the upper or top tube sheet having an opening with a guide structure mounted therein and the upper end of one of the conduits slidably received thereby, in approximately fluid-tight engagement;

Fig. 4 is a plan view of the contracting ring, constituting part of the approximately fluid-tight slidable union shown in Fig. 3;

Fig. 5 is a modification of the slidable union or guide structure shown in Fig. 3, the circular recesses here being in the exterior surface of the conduit rather than in the interior adjacent surface of the surrounding collar and expanding rings being substituted for the contracting ring of Fig. 3; and Fig. 6 shows still another type of freely slidable, approximately fluid-tight joint comprising a corrugated or bellows-like flexible member surrounding the conduit and located between it and the adjacent surface of the surrounding collar.

Referring more in detail to the drawings in the several figures of which like reference characters denote similar parts, 1 is an upright casing providing a reaction chamber 2 and manifolding chambers 3 and 4. Partition or tube sheet 5 separates the reaction chamber from the upper manifolding chamber, whereas partition or tube sheet 6 separates the lower manifolding chamber from the reaction chamber. The casing 1 is surrounded by insulation 7 and the free space in the reaction chamber, between conduits, is filled with a contact mass or catalyst 8. Tube sheet 6 is supported by beam or grid structure 9, the outer edges of which form a circular contour and are mounted on and tack-welded to a ring or shoe plate 10, which may be in one piece or split as shown. Ring or plate 10 rests freely on a supporting ring 11 which is welded to the wall of the casing 1. Conduits 12 having perforations or openings 12a and conduits 13 having perforations or openings 13a extend within the reaction chamber in upright and substantially parallel relation. The former group or series of conduits 12 may be considered as inlet conduits, for purposes of illustration, and the lower manifolding chamber 4 may be considered as an inlet manifold, while the group or series of conduits 13 may be considered as outlet conduits, and manifolding chamber 3, with which they communicate, may be considered as the outlet manifold, although the apparatus is obviously not limited to this path of flow.

By way of illustration, assume that a heavy hydrocarbon oil, for example a petroleum oil of the gas oil range, is being introduced into the reaction chamber. Also assume that the contact mass 8 comprises silicates of alumina or clayey materials, for example, activated hydrosilicate of alumina with or without the addition of other active ingredients, preferably formed in lumps, fragments, or molded pieces as indicated in the copending application of Eugene J. Houdry, Serial No. 600,581, filed March 23, 1932 which issued as Patent No. 2,078,945 on May 4, 1937. When the reactant hydrocarbon fluids, in vaporous or gaseous phase and at elevated temperatures of the order of 750° F. to 950° F., are introduced through conduits 12, and openings 12a therein, into the reaction chamber 2 in contact with the aforesaid catalytic mass, endothermic conversion of such reactants into lighter materials, for example of the gasoline range, will result. It is not uncommon in many such processes to introduce the reactants at a temperature somewhat above that desired in the contact mass so as to compensate in a measure at least for the heat absorbed in the endothermic conversion. The fluid products of reaction pass from the contact mass through openings 13a into conduits 13, thence to manifolding chamber 3, from which they may be educted by any suitable passage. As the reaction proceeds, the activity of the contact mass or catalyst dwindles, due to poisons such as coke and tarry or other combustible deposits which accumulate therein as a result of the reaction. To regenerate the mass, it is customary to stop the feeding of reactant fluids, purge the mass of reactants, for example with steam, and then pass a regeneration fluid, such as air or other oxygen-containing gas, through the reaction chamber and contact mass, for example through the same path in which reactants flowed, or in the reverse path. This regeneration is an exothermic reaction and, to compensate at least in part for the heat developed by the combustion within the contact mass, the regeneration fluid may be introduced at a temperature somewhat below the optimum regeneration temperature desired within the mass. After regeneration has been carried to the desired stage of completion, the mass may be purged of regeneration medium, for example with steam, and the flow of reactants through the mass again started.

When temperatures of the order of 850° F. may exist within the mass during the on-stream period and the reactant fluids may be sent thereinto at temperatures thereabout or somewhat higher, and when during regeneration higher temperatures even of the order of 1050° F. may be attained within the contact mass and regeneration media, such as air, may be fed thereto at substantially lower temperatures than any previously mentioned, for example at temperatures which may be as low as atmospheric, or even lower, it will be seen that the beam structure 9 and tube sheet 6, in the course of a complete cycle of operation, will undergo very appreciably different expansions and contractions. Also the conduits 12 and 13 will undergo expansions and contractions. The tube sheets 5 and 6, as well as the beam structure 9, will undergo expansions and contractions in a horizontal direction of different magnitudes at various particular times from the expansions or contractions of the casing or shell 1, as well as at rates different from each other. These differences are magnified when inner as well as the outer faces of shell 1 are protected by insulation, as disclosed in the copending application of T. B. Prickett, Serial No. 4,505, filed February 1, 1935, but for the sake of clearness and simplicity no showing of internal insulating members has been made.

To provide for these expansions or contractions, without distortion resulting to or extreme stresses being set up in other parts of the apparatus, the beam structure has been mounted upon but in freely floating or flowing relation with the walls of the casing 1. To this same end, both tube sheets are provided with elongated slots 25 extending in from their peripheries. The lower tube sheet 6 is supported upon beam structure 9, with its peripheral edge resting upon ring 14, which latter is welded to the wall of the casing with the sheet loosely or flexibly joined thereto by studs 15 which pass through the aforementioned elongated slots which can be seen most clearly in Fig. 2. Tube sheet or partition 5 is supported upon ring 16 (Fig. 1) which is welded or fastened to the wall of the casing and the sheet is loosely and flexibly joined to the ring by means of studs 17 which pass through elongated slots similar to those shown in Fig. 2. In addition, tube sheet 6 is not fastened to beam structure 9 but rather rests loosely thereon, in freely floating relation therewith. If needed or desired, a beam structure similar to 9 may be provided for tube sheet 5, the latter being loosely suspended beneath the same or resting thereon. Hence it will be seen that both tube sheets can expand or contract freely and independently of the rate of expansion or contraction of the casing 1 or of a beam structure, such as 9 supporting the same, and that the tube sheets will be supported by the beam structure against thrust from the expansion of the conduits.

Further, to avert disadvantages discussed above, the conduits 12 and 13 are all supported upon partition or tube sheet 6, but conduits 13 communicate with manifolding chamber 3 through the upper tube sheet 5, being slidably received by the latter and forming an approximately fluid type junction therewith. Three types of slidable, approximately fluid type junctions are illustrated in detail in Figs. 3, 5 and 6 and, in view of the indication of their purpose given above, they are practically self-explanatory. The guide structure shown in Fig. 3, which is a detail of those shown in upper tube sheet 5 of Fig. 1, comprises recessed cylindrical member or adapter 18 which has screw threads on two circumferences, the threads on the larger circumference being adapted to be received by co-acting threads in the surface of the opening in the tube sheet 5 and those on the smaller circumference being adapted to be received by the female threads of the collar 19. The collar provides a recess within which one or more contracting rings 20 are mounted.

The modification shown in Fig. 5 is slightly different from the above in that the collar 21 is welded to the tube sheet 5 and the conduit 13 has circular recesses 22 in its exterior surface in which expanding rings 23, either annular or spiral, are located, such rings engaging the adjacent interior surface of the surrounding collar 21 to prevent passage of fluid therethrough.

The bellows-like or corrugated arrangement shown in Fig. 6 is self-explanatory in view of the description of Fig. 5, the corrugated member 24 being composed of light gauge, spring metal, for example, which is confined between the conduit 13 and the surrounding collar 21a, the corrugated member engaging both the exterior surface of the conduit 13 and the surrounding interior surface of the collar. By reason of its thin section, member 24 should be highly resistant to corrosion, and, to provide a good seal, it should have a different and greater coefficient of expansion than adjacent parts. One material which meets these requirements is chrome nickel steel. The free end of collar 21a is reduced or provided with an annular stop mmeber 25, to keep sealing member 24 in place.

These slidable joints make it possible for expansions or contractions to take place in the walls of the casing 1 independently of expansions or contractions of the conduits, for example, if we imagine a case of contraction in the walls of the casing relative to the conduits, the upper tube sheet 5 can freely move toward bottom tube sheet 6, by virtue of the slidable unions or opening structures provided between the tube sheet 5 and the upper ends of conduits 13, the movement required being sufficient only to allow for the longitudinal contraction of the casing walls relative to that of the conduits. With the reverse thermal change in dimensions of the walls of the casing relative to that of the conduits, tube sheet or partition 5 will slightly recede from sheet 6, this being attended also by movement between the conduits and upper tube sheet at the slidable junction therebetween.

It will be noted that, in the embodiment illustrated, all of the conduits are supported by the lower tube sheet although a group or series of the conduits communicate with a manifold above the upper tube sheet. Hence it will be seen that when the conduits expand or contract, due to temperature changes, they move relative to the same fixed support and there is little or no tendency to crush the particles or moulded pieces of contact mass therebetween or against an adjacent surface, because the free ends of conduits extend upwardly to or above the normal level of the contact mass. When the conduits are heated up or cooled down, and thereby are caused to expand or contract, they tend to move together and not relative to each other, except when the different conduits are heated or cooled at different rates and even then the relative movement is kept to a minimum. This is important in averting deleterious effects on the contact mass. Moreover, the mounting of all conduits on the lower tube sheet with slidable movement of certain of them through the upper tube sheet reduces thrust and stress on both sheets; in fact, there is practically no load on the upper tube sheet except that produced by relative frictional movement of the conduits extending therethrough. Hence it is clear from the drawings and the above description that substantially complete freedom of movement of all rigid parts of a treating apparatus relative to each other, so as to provide for free expansion or contraction of such parts without distortion or injury to other parts, is provided by the present invention.

While I have employed a particular embodiment to illustrate my invention, it will be understood that my invention is not limited thereto but applies to all other forms of apparatus within the scope of the appended claims. For example, the beam and lower sheet structure would apply to apparatus for carrying out contact treatments and various other operations, whether or not conduits were employed within a reaction chamber thereof. It is also clear that the feature of providing substantially complete freedom of movement of all rigid parts of an apparatus relative to each other has broad utility in and application to apparatuses for performing fluid treating and various other operations. All such adaptations are comprehended within the scope of the appended claims.

What I claim is:

1. Apparatus for carrying out treating operations which comprises a casing providing a reaction chamber, at least two groups of conduits extending within said chamber, and means extending across and non-fixedly borne by said casing for supporting said conduits, both groups of said conduits being supported by said means, a partition member having a plurality of openings therethrough located in substantial spaced relation with said means and extending between the walls of said casing to form one end of said reaction chamber, the conduits of one only of said groups of conduits extending within the said openings in said partition member in slidable relation with the latter, elements of the apparatus being thereby assembled so as to provide freedom of expansion or contraction of the several rigid parts thereof without putting under stress other fixed parts thereof.

2. Apparatus adapted for carrying out a treating operation which comprises a casing providing a reaction chamber, a plurality of partitions within said casing and spaced from each other, and at least two groups of conduits located within said chamber, conduits of both of said groups being mounted on one only of said partitions and the conduits of one group communicating through the said partition on which they are mounted and the conduits of the other group communicating through another of said partitions in freely slidable relation therewith, each of the aforementioned elements being supported in place so as to permit limited movement thereof relative to the casing and adjacent parts, to permit free expansion and contraction of each element, the casing supporting the weight of all elements of the said apparatus.

3. Apparatus adapted for carrying out a treating operation which comprises a casing providing a chamber, a rigid partition member extending across said chamber, said partition member being flexibly joined to said casing to permit expansion or contraction thereof independent of that of the casing but in approximately fluid-tight relation therewith, a second partition extending across said chamber in spaced relation to said first partition, and conduits for facilitating the treating operation mounted upon one of said partitions and a portion only thereof communicating through and being free to expand or contract through the other of said partitions, said other partition being otherwise substantially imperforate.

4. Apparatus for effecting contacting operations which comprises a casing providing a reaction chamber, manifolding chambers adjacent the ends of said reaction chamber, each manifolding chamber being separated from said reaction chamber by a suitable partition or tube sheet, a plurality of perforated conduits extending into said reaction chamber and arranged in substantial parallelism therein, said conduits comprising a group of inlet and a group of outlet conduits, one group thereof communicating with one manifolding chamber ond the other group thereof communicating with the other manifolding chamber, at least substantially all of said conduits being supported on one of said partitions, a beam structure adjacent the last-mentioned partition, said beam structure being freely supported by said casing to permit expansion or contraction of the beam structure independent of the casing, said last mentioned partition resting freely against said beam structure to permit relative movement therebetween and being joined to said casing so as to be free to expand or contract independently of the casing but so that it forms an approximately fluid tight junction therewith, and the free ends of the conduits of one of said groups being slidably received by but forming a substantially fluid tight junction with openings in the partition remote from said last-mentioned partition.

5. Apparatus for carrying out treating operations which comprises a casing providing a reaction chamber, perforated inlet and outlet conduits extending within said chamber, and means including a sheet structure adjacent one end of said chamber and non-fixedly borne by said casing to provide relative movement therebetween, both said inlet and outlet conduits being mounted in the sheet structure of said last-mentioned means so as to be supported by such means and one type only of said conduits having fluid communication through said sheet structure.

6. Apparatus for carrying out treating operations which comprises a casing providing a reaction chamber, a plurality of conduits extending within said chamber, means including a sheet structure adjacent one end of said chamber and non-fixedly borne by the casing yet in approximately fluid-tight relation with adjacent portions thereof, said conduits being mounted on said sheet structure so that the weight thereof is supported by the said means including the said sheet structure, a second sheet adjacent the other end of said chamber and spaced from the free ends of a group of the aforesaid conduits, and guide means in said second sheet through which a second group of the aforesaid conduits pass in freely sliding relation to permit free expansion or contraction of said group of conduits relative to other portions of the apparatus.

7. Apparatus for carrying out treating operations which comprises a casing providing a reaction chamber, a contact mass within said chamber, a plurality of conduits extending within said chamber and imbedded in said contact mass, at least a portion of said conduits having perforations or openings at spaced intervals along the length of each, means including a sheet structure adjacent one end of said chamber and non-fixedly borne by the casing yet in approximately fluid-tight relation with adjacent portions thereof, said conduits being mounted on said sheet structure so that the weight thereof is supported by the said means including the said sheet structure, a second sheet structure adjacent the other end of said chamber and spaced from the free ends of a group of the aforesaid conduits, and guide means in said second sheet through which a second group of the aforesaid conduits pass in freely sliding relation to permit free expansion or contraction of said group of conduits relative to other portions of the apparatus and so as to permit one sheet structure to move toward or away from the other without causing movement in the same direction of one group of conduits relative to the other.

8. In apparatus for carrying out treating operations which includes a casing providing a reaction chamber, an inlet manifolding chamber adjacent one end of said reaction chamber and an outlet manifolding chamber adjacent the other end thereof, each being separated therefrom by a suitable partition, and a plurality of conduits, having perforations or openings along the length of each, extending into said reaction chamber and arranged in substantial parallelism, one group thereof communicating with the inlet manifold and a second group thereof communicating with the outlet manifold, that improvement which comprises fixedly supporting at least substantially all of said conduits on a said partition at one end of said reaction chamber and having the opposite ends of one of said groups of conduits slidably received by the partition at the other end of the reaction chamber.

9. Apparatus for carrying out treating operations which comprises a casing providing a reaction chamber, a plurality of conduits arranged in substantially parallel relation and extending within said chamber, sheet structures bounding either end of said reaction chamber and spaced from either end of the said casing to provide chambers adjacent either end of said reaction chamber adapted to serve as manifolding chambers, a group of said conduits communicating through one of said sheet structures with the adjacent manifolding chamber and a second group thereof communicating through the other sheet structure with the manifolding chamber adjacent to it, said conduits being all mounted on one sheet structure and a group thereof extending through guide structures in the other sheet in freely sliding relation therewith, so as to permit one sheet structure to move toward or away from the other without causing movement in the same direction of one group of conduits relative to the other.

10. Apparatus for carrying out treating operations which comprises a casing providing a reaction chamber, a contact mass within said chamber, a plurality of conduits arranged in substantially parallel relation and extending within said chamber and imbedded in said mass, sheet structures bounding either end of said reaction chamber and spaced from either end of the said casing to provide chambers adjacent either end of said reaction chamber adapted to serve as manifolding chambers, a group of said conduits communicating through one of said sheet structures with the adjacent manifolding chamber and a second group thereof communicating through the opposite sheet structure with the manifolding chamber adjacent to it, conduits of at least one of said groups having perforations or openings spaced from each other along the length of each, said conduits being all mounted on one of said sheet structures, openings in the opposite sheet structure each having a guide structure therearound, and a group of said conduits each extending through a said opening within a said guide structure in the said opposite sheet structure in freely sliding relation therewith, so as to permit one sheet structure to move toward or away from the other without causing movement in the same direction of one group of conduits relative to the other.

11. In apparatus for carrying out a treating operation which includes an upright casing providing a reaction chamber, manifolding chambers adjacent the top and bottom of said reaction chamber, each being separated therefrom by a suitable partition, and a plurality of conduits extending into said reaction chamber and arranged in substantially upright position therein, one group thereof communicating with the lower manifolding chamber and a second group thereof communicating with the upper manifolding chamber, that improvement which comprises supporting at least substantially all of the conduits of both of said groups on a said partition at the bottom of said reaction chamber and supporting said bottom partition freely on top of a beam structure, said beam structure being freely supported by said casing to permit expansion or contraction of the beam structure independently of the casing and said partition being joined to said casing so that it is free to expand or contract independently of the casing but so that it forms an approximately fluid-tight junction therewith.

12. Apparatus for carrying out treating operations which comprises a casing providing a chamber, and means for conducting fluids extending into said chamber, all of said means being mounted in one wall of said chamber and opposite ends of a portion only thereof extending through an opposite wall of said chamber, and means maintaining said last named ends in substantially fluid-tight but freely slidable relation with said opposite wall.

13. Apparatus for carrying out treating operations which comprises a casing providing a chamber and a plurality of apertured conduits extending into said chamber, said conduits comprising at least two groups being all supported in a wall of said chamber and the opposite ends of one group only thereof being open and extending through an opposite wall of said chamber in substantially fluid-tight but freely slidable relation therewith.

14. Apparatus for carrying out treating operations which comprises an upright casing providing a reaction chamber, a plurality of conduits, arranged in approximately upright and in substantially parallel relation, extending within said chamber, and sheet structures bounding the top and bottom of said chamber, all of said conduits being mounted on one sheet and a portion only, comprising one group thereof, extending in freely sliding relation through the other sheet structure.

15. Apparatus for carrying out treating operations which comprises an upright casing providing a reaction chamber, a plurality of conduits, arranged in approximately upright relation, extending within said chamber, and a sheet structure bounding the top and bottom of said chamber, all of said conduits being mounted on the bottom sheet structure and a portion only, comprising one group thereof, extending in freely sliding relation through the top sheet structure.

16. Apparatus for carrying out treating operations which comprises an upright casing providing a reaction chamber, a contact mass within said chamber, a plurality of conduits having perforations or openings at spaced intervals along the length of each and arranged in approximately upright relation within said chamber, said conduits being imbedded in said contact mass, a sheet structure bounding the bottom of said chamber, a second sheet structure bounding the top of said chamber and having openings therein through which conduits may pass, all of said conduits being mounted on the said bottom sheet structure and a portion only of said conduits, comprising one group thereof, having ends extending in freely sliding relation through the said openings in the said top sheet structure.

17. In apparatus for carrying out treating operations, a casing providing a reaction chamber and elements of apparatus located within said reaction chamber, means for supporting said elements comprising a beam-like structure loosely supported by said casing and a sheet structure resting upon said beam-like structure and free to expand or contract relative thereto, said sheet structure being joined loosely yet in approximately fluid-tight relation to adjacent portions of the said casing.

18. In apparatus for carrying out treating operations, a casing providing a reaction chamber and elements of apparatus located within said reaction chamber, structure for supporting said elements which comprises means providing supporting surfaces affixed to and extending around the inside circumference of said casing, a ring loosely resting upon said supporting surfaces, a grid-like or beam-like structure supported by said ring, and a sheet adjacent to the last-mentioned structure and free to expand or contract relative thereto, said sheet forming an approximately fluid-tight junction with the inside surface of said casing.

19. In apparatus for carrying out treating operations, in combination, a casing providing a reaction chamber, a contact mass within said chamber, at least two perforated conduits extending within said chamber and embedded in said mass, a sheet structure adjacent one end of said chamber on which both of said conduits are mounted, one of said conduits communicating through said sheet with an adjacent manifold and another of said conduits having no fluid communication through said sheet, and another sheet structure adjacent the other end of said reaction chamber having at least one opening therethrough and guide structure at such opening in the last-mentioned sheet adapted to slidably receive an end of the said conduit having no fluid communicating relation through the first-mentioned sheet structure, said structure having an element which will move toward or away from the conduit in response to lateral pressures created by axial movement of the conduit through the sheet, thereby to maintain the slidable junction between the conduit and the said sheet approximately fluid-tight.

CLARENCE H. THAYER.